(12) United States Patent
Huang

(10) Patent No.: US 11,064,062 B2
(45) Date of Patent: Jul. 13, 2021

(54) MOBILE TERMINAL

(71) Applicant: Wuhan China Star Optoelectronics Semiconductor Display Technology Co., Ltd., Hubei (CN)

(72) Inventor: Tianyu Huang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 184 days.

(21) Appl. No.: 16/462,933

(22) PCT Filed: Jan. 3, 2019

(86) PCT No.: PCT/CN2019/070304
§ 371 (c)(1),
(2) Date: May 21, 2019

(87) PCT Pub. No.: WO2020/118808
PCT Pub. Date: Jun. 18, 2020

(65) Prior Publication Data
US 2020/0412856 A1    Dec. 31, 2020

(30) Foreign Application Priority Data

Dec. 15, 2018 (CN) .......................... 201811537687.7

(51) Int. Cl.
H04M 1/02    (2006.01)
G06F 1/16    (2006.01)
H04M 1/03    (2006.01)

(52) U.S. Cl.
CPC ....... *H04M 1/0268* (2013.01); *H04M 1/0262* (2013.01); *H04M 1/0264* (2013.01); *H04M 1/03* (2013.01)

(58) Field of Classification Search
None
See application file for complete search history.

(56) References Cited

U.S. PATENT DOCUMENTS

| 10,303,268 | B2* | 5/2019 | Yu ......................... G06F 3/0487 |
| 2011/0095975 | A1* | 4/2011 | Hwang .................... G06F 3/016 345/156 |

(Continued)

FOREIGN PATENT DOCUMENTS

| CN | 102945065 A | 2/2013 |
| CN | 103442104 A | 12/2013 |

(Continued)

*Primary Examiner* — Quoc D Tran
(74) *Attorney, Agent, or Firm* — Hamre, Schumann, Mueller & Larson, P.C.

(57) ABSTRACT

A novel mobile terminal is provided. The mobile terminal includes a display screen element, a battery element, and a machine chip element separately disposed. Because the main functional components in the mobile terminal, such as the display screen element, the battery element, and the machine chip, are arranged separately, a shape of the display screen is no longer restricted by the shape of the functional components, such as the battery and the chip, and can be set to any shapes. Thus, a flexible screen can be bent arbitrarily, and the problems that the flexible display screen disposed in the conventional mobile terminal is subject to the shape of functional components and cannot be bent arbitrarily are solved.

18 Claims, 2 Drawing Sheets

(56) References Cited

U.S. PATENT DOCUMENTS

| | | | | |
|---|---|---|---|---|
| 2015/0248149 A1* | 9/2015 | Yamazaki | ............... | G06F 1/263 |
| | | | | 361/679.27 |
| 2016/0195902 A1* | 7/2016 | Huh | ........................ | G06F 1/188 |
| | | | | 345/156 |
| 2016/0291641 A1* | 10/2016 | Doyle | ................... | H05K 1/0296 |
| 2019/0041911 A1* | 2/2019 | Ahn | ....................... | G06F 1/1686 |
| 2019/0312451 A1* | 10/2019 | An | ........................ | G06F 1/3265 |
| 2019/0370779 A1* | 12/2019 | Lee | ...................... | G06K 7/1095 |

FOREIGN PATENT DOCUMENTS

| | | | |
|---|---|---|---|
| CN | 104423429 A | 3/2015 | |
| CN | 107864246 A | 3/2018 | |
| CN | 207341305 U | 5/2018 | |

\* cited by examiner

MOBILE TERMINAL

FIELD OF INVENTION

This disclosure relates to terminal technology, and more particularly, to a mobile terminal.

BACKGROUND OF INVENTION

In recent years, organic light emitting diode (OLED) display technology is gradually popularizing in mobile phones and TV market, and a yield rate has been greatly improved. The status of next-generation OLED display technology is unassailable, and flexible displays based on OLED are important directions of research and development in future display technology.

However, due to a battery and a chip disposed in a mobile terminal, the terminal using a flexible display, such as an OLED display panel, can only achieve simple inner bending or outer bending, and cannot achieve any bending in any circumstances, such as winding into a roll.

That is to say, the conventional mobile terminal has a technical problem that a flexible display screen is subject to the shape of a functional component, such as a battery or a chip, and cannot be bent arbitrarily.

SUMMARY OF INVENTION

The disclosure provides a mobile terminal for solving the problems that a flexible display screen disposed in a conventional mobile terminal is subject to the shape of functional components and cannot be bent arbitrarily.

In order to solve the above-mentioned drawbacks, the disclosure provides a technical solution as follow.

The disclosure provides a mobile terminal. The mobile terminal comprises:

a display screen element comprising at least one display screen and a first data interface;

a battery element comprising a battery, a charging unit, a second data interface, and a first wireless communication element, wherein the second data interface corresponds to the first data interface, and the charging unit charges the battery;

a machine chip element comprising a primary functional element, a second wireless communication element, and a power supply unit, wherein the second wireless communication element corresponds to the first wireless communication element, and the power supply unit charges the primary functional element and the second wireless communication element;

wherein the display screen element, the battery element, and the machine chip element are separately disposed, the display screen element and the battery element transmit power and data through the second data interface and the first data interface, the battery element and the machine chip element proceed data transmission with the first wireless communication element through the second wireless communication element.

According to the mobile terminal of the disclosure, the at least one display screen is a flexible display screen, and the first data interface is disposed on a first side of the flexible display screen.

According to the mobile terminal of the disclosure, the first data interface comprises a port, the port provides a drive signal to the flexible display screen.

According to the mobile terminal of the disclosure, the flexible display screen is an organic light emitting diode display screen.

According to the mobile terminal of the disclosure, the flexible display screen is electronic paper.

According to the mobile terminal of the disclosure, the display screen element further comprises an auxiliary functional element disposed on a second side of the flexible display screen, the second side is an opposite side to the first side of the flexible display.

According to the mobile terminal of the disclosure, the display screen element further comprises an auxiliary functional element disposed on the first side of the flexible display screen.

According to the mobile terminal of the disclosure, the auxiliary functional element comprises at least one selected from a camera and a light sensor.

According to the mobile terminal of the disclosure, the light sensor comprises at least one selected from a face recognition functional element, a distance sensor, and a light intensity sensor.

According to the mobile terminal of the disclosure, the display screen element further comprises a memory deformation element, the memory deformation element comprises at least two states, when the display screen element and the battery element do not transmit power and data through the second data interface and the first data interface, the display screen element is integrally in a form of a roll paper state, and when the display screen element and the battery element transmit power and data through the second data interface and the first data interface, the display screen element integrally in a form of an unfolded state.

According to the mobile terminal of the disclosure, the memory deformation element comprises a deformation body and a control unit, the deformation body comprises two states of a roll paper state and an unfolded state, and the control unit is configured to control the deformation body to switch from the roll paper state to the unfolded state when power is detected.

According to the mobile terminal of the disclosure, the deformation body comprises a memory metal frame.

According to the mobile terminal of the disclosure, the deformation body comprises a planar memory metal.

According to the mobile terminal of the disclosure, the deformation body comprises at least one material selected from a TiNi-based shape memory alloy, a copper-based shape memory alloy, and an iron-based shape memory alloy.

According to the mobile terminal of the disclosure, the control unit comprises a heat generating resistor to convert electrical energy into thermal energy for transforming the deformation body to the unfolded state when power is detected.

According to the mobile terminal of the disclosure, the charging unit comprises at least one selected from a charging interface or a wireless charging coil.

According to the mobile terminal of the disclosure, the first wireless communication element comprises a first Bluetooth unit as a slave device and the second wireless communication element comprises a second Bluetooth unit as a master device.

According to the mobile terminal of the disclosure, the power supply unit comprises a thermoelectric material layer, the thermoelectric material layer is at least partially wrapped by the machine chip element.

According to the mobile terminal of the disclosure, the battery element further comprises a signal conversion unit, the signal conversion unit is disposed between the second data interface and the first wireless communication element for converting a data format of the data.

According to the mobile terminal of the disclosure, the machine chip element is disposed within a portable terminal.

The technical effects are as follows. The disclosure provides a novel mobile terminal including the display screen element, the battery element, and the machine chip element separately disposed. The display screen element and the battery element transmit power and data through the second data interface and the first data interface, the battery element and the machine chip element proceed data transmission with the first wireless communication element through the second wireless communication element. Because the main functional components in the mobile terminal, such as the display screen element, the battery element and the machine chip, are arranged separately, a shape of the display screen is no longer restricted by the shape of the functional components such as the battery and the chip, and can be set to any shape. Thus, a flexible screen can be bent arbitrarily, and the problems that the flexible display screen disposed in the conventional mobile terminal is subject to the shape of functional components and cannot be bent arbitrarily is solved.

DESCRIPTION OF DRAWINGS

In order to more clearly illustrate the embodiments of the present invention or the technical solutions in the prior art, the following briefly introduces the accompanying drawings used in the embodiments. Obviously, the drawings in the following description merely show some of the embodiments of the present invention. As regards one of ordinary skill in the art, other drawings can be obtained in accordance with these accompanying drawings without making creative efforts.

DETAILED DESCRIPTION OF PREFERRED EMBODIMENTS

Figure 1:
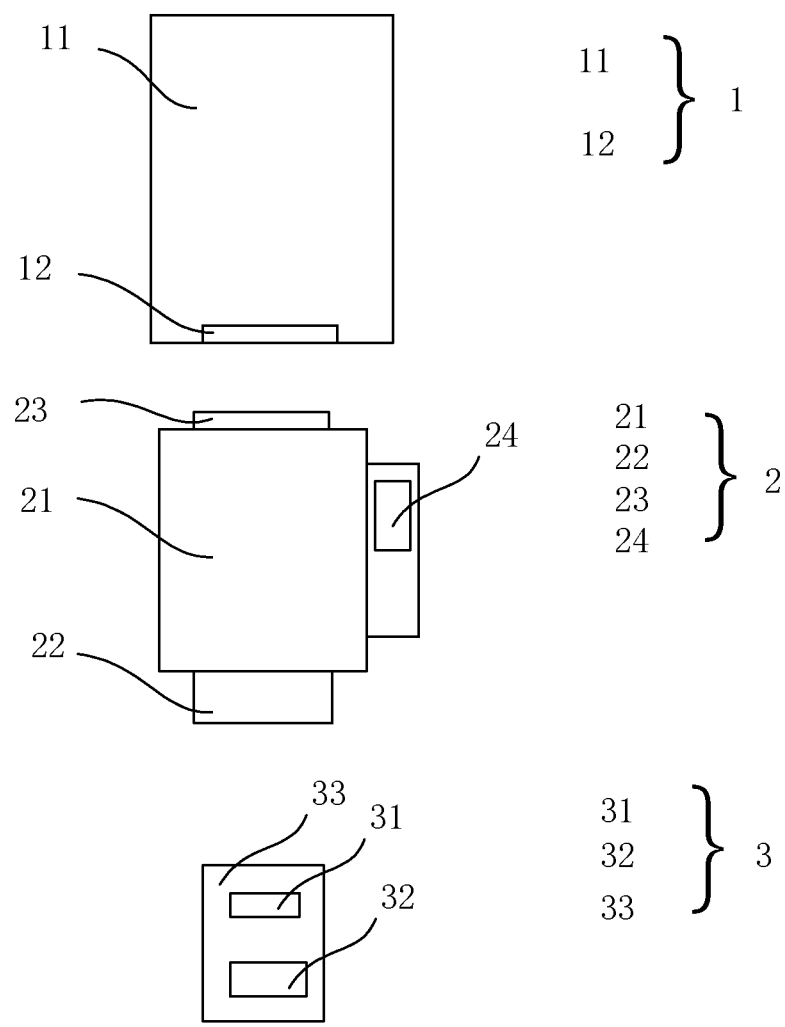
FIG. 1 is a schematic structural diagram of a mobile terminal according to an embodiment of this disclosure.

This description of the exemplary embodiments is intended to be read in connection with the accompanying drawings, which are to be considered part of the entire written description. In the description, terms such as "lower", "upper", "horizontal", "vertical", "above", "below", "up", "down", "top", and "bottom", as well as derivatives thereof, should be construed to refer to the orientation as then described or as shown in the drawing under discussion. These terms are for convenience of description and do not require that the apparatus be constructed or operated in a particular orientation, and do not limit the scope of the disclosure. Referring to the drawings of the disclosure, similar elements are labeled with the same number.

The embodiment of this disclosure provides a mobile terminal for solving the problems that a flexible display screen disposed in a conventional mobile terminal is subject to the shape of functional components and cannot be bent arbitrarily.

In embodiment, as shown in FIG. 1, the mobile terminal comprises:

a display screen element 1 comprising at least one display screen 11 and a first data interface 12;

a battery element 2 comprising a battery 21, a charging unit 22, a second data interface 23, and a first wireless communication element 24, wherein the second data interface 23 corresponds to the first data interface 12, and the charging unit 22 charges the battery 21;

a machine chip element 3, comprising a primary functional element 31, a second wireless communication element 32, and a power supply unit 33, wherein the second wireless communication element 32 corresponds to the first wireless communication element 24, and the power supply unit 33 charges the primary functional element 31 and the second wireless communication element 32;

wherein the display screen element 1, the battery element 2, and the machine chip element 3 are separately disposed, the display screen element 1 and the battery element 2 transmit power and data through the second data interface and the first data interface, the battery element 2 and the machine chip element 3 proceed data transmission with the first wireless communication element through the second wireless communication element.

The embodiment of this disclosure provides the mobile terminal including the display screen element, the battery element, and the machine chip element separately disposed. The display screen element and the battery element transmit power and data through the second data interface and the first data interface, the battery element and the machine chip element proceed data transmission with the first wireless communication element through the second wireless communication element. Because main functional components in the mobile terminal, such as the display screen element, the battery element, and the machine chip, are arranged separately, a shape of the display screen is no longer restricted by the shape of the functional components, such as the battery and the chip, and can be set to any shapes. Thus, a flexible screen can be bent arbitrarily, and the problems that the flexible display screen disposed in the conventional mobile terminal is subject to the shape of functional components and cannot be bent arbitrarily are solved.

Figure 2:
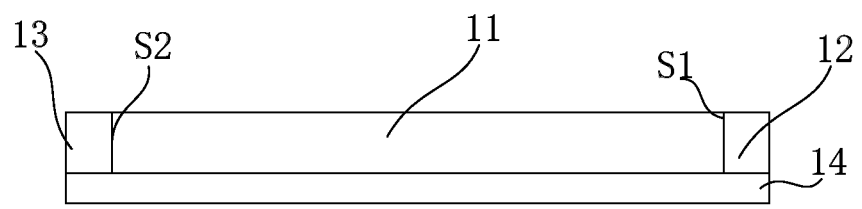
FIG. 2 is a schematic structural diagram of a display screen element according to an embodiment of this disclosure.

In an embodiment of the disclosure, the at least one display screen 11 is a flexible display screen, as shown in FIG. 2. The first data interface 12 is disposed on a first side S1 of the flexible display screen.

In an embodiment of the disclosure, the first data interface comprises a port, the port provides a drive signal (including grayscale voltage, etc.) to the flexible display screen.

In this disclosure, the first data interface of the display screen element is inserted into the battery element to start communication. The first data interface realizes a function of a cable, that is, a signal transmitted from the battery element to the display screen element through the first data interface directly drives the display screen to display, and a touch signal of the display screen is directly transmitted to the battery element through the interface.

In an embodiment of the disclosure, the flexible display screen is an organic light emitting diode display screen.

In an embodiment of the disclosure, a touch function layer is integrated in the OLED display screen to achieve an effect of a touch function.

In an embodiment of the disclosure, the flexible display screen is a flexible screen, such as electronic paper.

In an embodiment of the disclosure, as shown in FIG. 2, the display screen element further comprises an auxiliary functional element 13 disposed on a second side S2 of the flexible display screen. The second side S2 is an opposite side to the first side S1 of the flexible display.

In an embodiment of the disclosure, the display screen element further comprises an auxiliary functional element disposed on the first side of the flexible display screen.

In an embodiment of the disclosure, the auxiliary functional element comprises at least one selected from a camera and a light sensor.

In an embodiment of the disclosure, the light sensor comprises at least one selected from a face recognition functional element, a distance sensor, and a light intensity sensor.

For the display screen in this embodiment, on one side of the screen, a camera, a speaker, and a signal interface are deposed. The signal interface can be directly inserted into the battery. With this side as the axis, the entire display screen is designed as a roll paper, which is expanded when used.

In an embodiment of the disclosure, as shown in FIG. 2, the display screen element 1 further comprises a memory deformation element 14. The memory deformation element 14 comprises at least two states. When the display screen element 1 and the battery element do not transmit power and data through the second data interface and the first data interface, the memory deformation element is in a form of a roll paper state. The display screen element 1 is integrally in a form of a roll paper state. When the display screen element 1 and the battery element transmit power and data through the second data interface and the first data interface, the memory deformation element is in a form of an unfolded state. The display screen element integrally in a form of an unfolded state.

In an embodiment of the disclosure, the memory deformation element 14 comprises a deformation body and a control unit, the deformation body comprises two states of a roll paper state and an unfolded state, and the control unit is configured to control the deformation body to switch from the roll paper state to the unfolded state when power is detected.

In an embodiment of the disclosure, the deformation body comprises a memory metal frame or a planar memory metal.

In an embodiment of the disclosure, the deformation body comprises at least one material selected from a TiNi-based shape memory alloy, a copper-based shape memory alloy, and an iron-based shape memory alloy.

In an embodiment of the disclosure, the control unit comprises a heat generating resistor to convert electrical energy into thermal energy for transforming the deformation body to the unfolded state when power is detected.

In an embodiment of the disclosure, the charging unit 22 comprises at least one selected from a charging interface or a wireless charging coil.

In an embodiment of the disclosure, the first wireless communication element 24 comprises a first Bluetooth unit as a slave device and the second wireless communication element 32 comprises a second Bluetooth unit as a master device. The second wireless communication component 32 is the master device, and the first wireless communication component 24 is the slave device, so that the paired battery cannot be paired with other devices at the same time, and the second wireless communication component 32 actively sends a Bluetooth connection request to a nearby battery. After the battery element is connected to the display screen element, the display screen can be touched to agree or reject the connection request.

In an embodiment of the disclosure, the power supply unit 33 comprises a thermoelectric material layer, and the thermoelectric material layer is at least partially wrapped by the machine chip element.

In an embodiment of the disclosure, the thermoelectric material layer includes antimony telluride and its alloys and the like.

Figure 3:
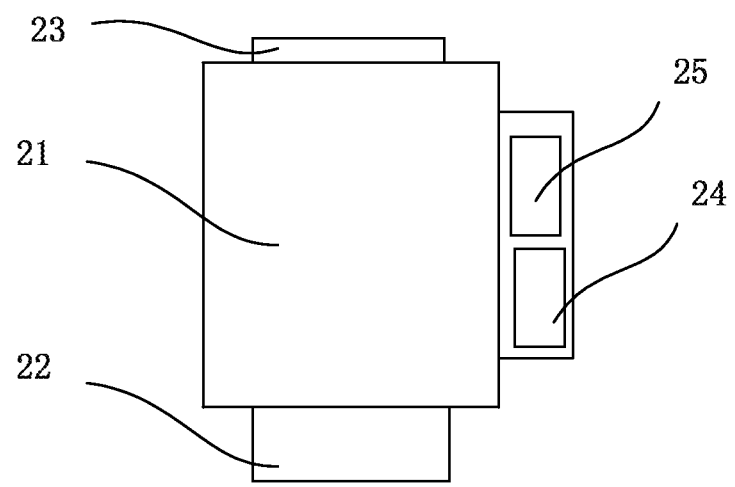
FIG. 3 is a schematic structural diagram of a battery element according to an embodiment of this disclosure.

In an embodiment of the disclosure, as shown in FIG. 3, the battery element 2 further comprises a signal conversion unit 25. The signal conversion unit 25 is disposed between the second data interface 23 and the first wireless communication element 24 for converting a data format of the data.

In an embodiment of the disclosure, the battery element and the machine chip element both comprise a modulation and demodulation unit. The machine chip element modulates the signal and transmits the signal to the battery element through the Bluetooth. After the signal is demodulated, the signal is directly transmitted to a display module to drive the display screen. The touch signal transmitted from the display screen to the battery element after modulation is transferred to the machine chip element, and the machine chip element is responsible for demodulation and calculation.

In an embodiment of the disclosure, the machine chip element is disposed within a portable terminal for a user to carry.

In an embodiment of the disclosure, the portable terminal includes at least one selected from a watch, a necklace, or a headphone.

In an embodiment of the disclosure, in mobile terminals, such as mobile phones, the chip occupies only a small space, and the auxiliary units, such as storage, a telephone card slot, an antenna, and a demodulator can still be integrated into a small module. The small module can be implanted into watches, necklaces, and other accessories, etc., even in an earphone, to form the machine chip element 3. The machine chip element 3 communicates with other modules through Bluetooth. Bluetooth still needs a small amount of electricity. The machine chip element 3 is encapsulated by a special material. The special material is a thermoelectric material, that is, a material that can directly convert thermal energy into electrical energy, and the thermal energy can come from a person's body temperature.

Based on the above description, the mobile terminal provided by the disclosure can truly realize that the mobile phone is light and flexible. A machine chip element connected with a small-capacity battery element can be carried with the user. A machine chip element of a display screen connected with a large-capacity battery element can be placed in a conference room, cafes, or shared to public places, and ready to stand by.

The embodiment of this disclosure provides the mobile terminal including the display screen element, the battery element, and the machine chip element separately disposed. The display screen element and the battery element transmit power and data through the second data interface and the first data interface, the battery element and the machine chip element proceed data transmission with the first wireless communication element through the second wireless communication element. Because the main functional components in the mobile terminal, such as the display screen element, the battery element, and the machine chip, are arranged separately, a shape of the display screen is no longer restricted by the shape of the functional components, such as the battery and the chip, and can be set to any shapes. Thus, the flexible screen can be bent arbitrarily, and the problems that the flexible display screen disposed in the conventional mobile terminal is subject to the shape of functional components and cannot be bent arbitrarily are solved.

This disclosure has been described with preferred embodiments thereof, and it is understood that many changes and modifications to the described embodiment can be carried out without departing from the scope and the spirit of the invention.

What is claimed is:

1. A mobile terminal, comprising:
a display screen element comprising at least one display screen and a first data interface, wherein the display screen is a flexible display screen, and the first data interface is disposed on a first side of the flexible display screen;
a battery element comprising a battery, a charging unit, a second data interface, and a first wireless communication element, wherein the second data interface corresponds to the first data interface, and the charging unit charges the battery;
a machine chip element comprising a primary functional element, a second wireless communication element, and a power supply unit, wherein the second wireless communication element corresponds to the first wireless communication element, and the power supply unit charges the primary functional element and the second wireless communication element;
wherein the display screen element, the battery element, and the machine chip element are separately disposed, the display screen element and the battery element transmit power and data through the second data interface and the first data interface, the battery element and the machine chip element proceed data transmission with the first wireless communication element through the second wireless communication element; and
wherein the display screen element further comprises a memory deformation element, the memory deformation element comprises at least two states, when the display screen element and the battery element do not transmit power and data through the second data interface and the first data interface, the display screen element is integrally in a form of a roll paper state, and when the display screen element and the battery element transmit power and data through the second data interface and the first data interface, the display screen element integrally in a form of an unfolded state.

2. The mobile terminal according to claim 1, wherein the first data interface comprises a port, the port provides a drive signal to the flexible display screen.

3. The mobile terminal according to claim 1, wherein the flexible display screen is an organic light emitting diode display screen.

4. The mobile terminal according to claim 1, wherein the flexible display screen is electronic paper.

5. The mobile terminal according to claim 1, wherein the display screen element further comprises an auxiliary functional element disposed on a second side of the flexible display screen, the second side is an opposite side to the first side of the flexible display.

6. The mobile terminal according to claim 1, wherein the display screen element further comprises an auxiliary functional element disposed on the first side of the flexible display screen.

7. The mobile terminal according to claim 6, wherein the auxiliary functional element comprises at least one selected from a camera and a light sensor.

8. The mobile terminal according to claim 7, wherein the light sensor comprises at least one selected from a face recognition functional element, a distance sensor, and a light intensity sensor.

9. The mobile terminal according to claim 1, wherein the memory deformation element comprises a deformation body and a control unit, the deformation body comprises two states of a roll paper state and an unfolded state, and the control unit is configured to control the deformation body to switch from the roll paper state to the unfolded state when power is detected.

10. The mobile terminal according to claim 9, wherein the deformation body comprises a memory metal frame.

11. The mobile terminal according to claim 9, wherein the deformation body comprises a planar memory metal.

12. The mobile terminal according to claim 9, wherein the deformation body comprises at least one material selected from a TiNi-based shape memory alloy, a copper-based shape memory alloy, and an iron-based shape memory alloy.

13. The mobile terminal according to claim 9, wherein the control unit comprises a heat generating resistor to convert electrical energy into thermal energy for transforming the deformation body to the unfolded state when power is detected.

14. The mobile terminal according to claim 9, wherein the charging unit comprises at least one selected from a charging interface or a wireless charging coil.

15. The mobile terminal according to claim 9, wherein the first wireless communication element comprises a first Bluetooth unit as a slave device and the second wireless communication element comprises a second Bluetooth unit as a master device.

16. The mobile terminal according to claim 9, wherein the power supply unit comprises a thermoelectric material layer, the thermoelectric material layer is at least partially wrapped by the machine chip element.

17. The mobile terminal according to claim 9, wherein the battery element further comprises a signal conversion unit, the signal conversion unit is disposed between the second data interface and the first wireless communication element for converting a data format of the data.

18. The mobile terminal according to claim 1, wherein the machine chip element is disposed within a portable terminal.

* * * * *